June 8, 1937. E. J. PODANY 2,082,904
ELECTRIC WELDING APPARATUS
Filed March 18, 1935 2 Sheets-Sheet 2
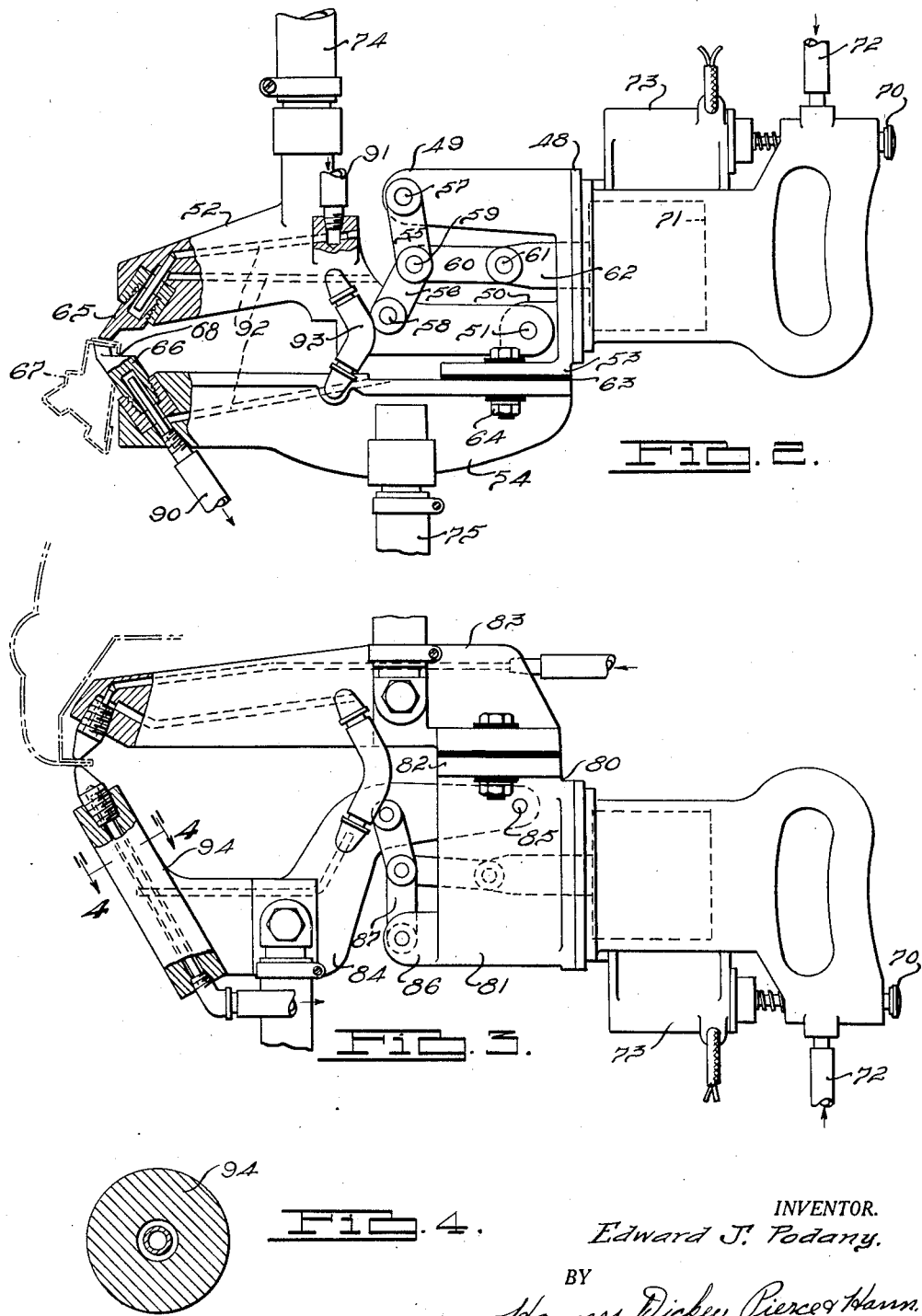
INVENTOR.
Edward J. Podany.
BY
Harness, Dickey, Pierce & Hann.
ATTORNEYS.

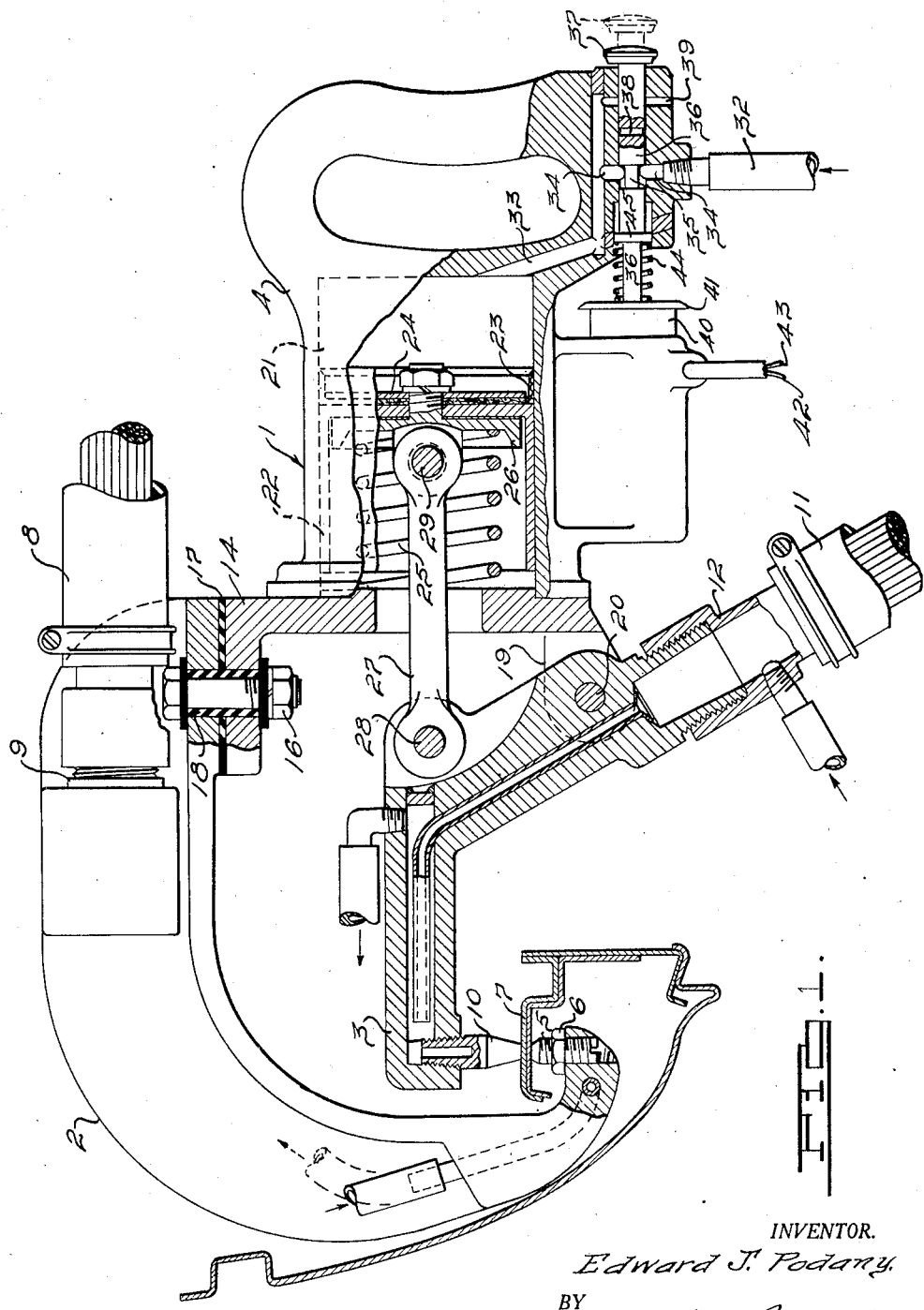

Patented June 8, 1937

2,082,904

UNITED STATES PATENT OFFICE 2,082,904

ELECTRIC WELDING APPARATUS

Edward J. Podany, Detroit, Mich., assignor to The Murray Corporation of America, a corporation of Delaware Application March 18, 1935, Serial No. 11,536

6 Claims. (Cl. 219—4)

The present invention relates to tools for use in electric welding, and more particularly to portable tools of this character.

Electric welding operations are used in many industries in the factory assembly of parts. In connection with certain of these welding operations, the parts to be welded present readily accessible surfaces, thus somewhat simplifying the problem of carrying the welding electrodes to the parts to be welded. In many instances, however, the welding surfaces are relatively inaccessible and for these the usual constructions of portable welding guns are generally unsuitable.

The present invention provides a portable welding gun, particularly suitable for working relatively inaccessible surfaces. In accordance with the present invention, the two welding electrodes of the welding gun are mechanically related through a system of linkages which permit considerable relative movement between the electrodes, thus affording freedom in positioning the welding gun upon the surfaces to be welded. Means are incorporated into the welding gun to force the electrodes into engagement with the surfaces to be welded with a predetermined uniform pressure, thus insuring consistent welding action. Additional means also incorporated into the welding gun are arranged to control the flow of welding current and are actuable only after the just mentioned predetermined welding pressure has been obtained. In the illustrated embodiments of the present invention the pressure control means and the circuit control means are jointly actuable by a hand switch conveniently located on the welding gun housing.

The principal object of the present invention accordingly is to provide a portable welding gun having the above mentioned operating characteristics and which is compact in form, readily transportable, simple in construction and positive in action. Other objects and advantages of the present construction appear in the following description and in the appended claims.

Referring to the drawings:

Figure 1 is a view in side elevation, with parts shown in section, of a portable welding gun embodying the present invention;

Fig. 2 is a view in side elevation, with parts shown in section, of a modification of the present invention;

Fig. 3 is a view in side elevation, partly in section, of a second modification of the present invention; and Fig. 4 is a sectional view taken on the line 4—4 of Fig. 3.

Referring to Fig. 1, welding gun 1 comprises electrode sections 2 and 3 and a handle section 4. Electrode section 2 is formed of tapered construction to enable the end thereof to enter relatively restricted parts, and terminates in an electrode 5, secured in place by means of a lock nut 6. Electrode 5 is illustrated as bearing against a re-inforcing member 7 associated with the top panel of an automobile body. Electrode 5 is electrically connected to a source of welding current through a flexible cable 8, connected to section 2 by a connecter 9.

Electrode 10 is threaded into the end of section 3 and is electrically connected to the opposite terminal of the welding current supply through flexible cable 11, connected to section 3 through a threaded connecter 12.

Section 2 is bolted to base member 14 by bolt 16, but is insulated therefrom by members 17 and 18. Base 14 is also provided with a journal section 19 which supports a bifurcated yoke section of member 3 and, with pin 20, forms a pivotal support for section 3.

Handle section 4, attached to base member 14 in any suitable manner, is hollowed out to form a piston chamber 21, which accommodates a cuplike piston 22, provided with a packing gland 23 and retaining ring 24. A spring 25 bears against base member 14 and urges piston 22 to the right in Fig. 1.

Piston 22 controls electrode section 3 through connecting rod 27, pivotally connected to section 3 by pin 28, and pivotally connected to piston 22 by means of pin 29 and a yoke formed in spring cup 26.

Chamber 21 communicates with a source of air or other fluid pressure 32 through ports 33 and 34. Port 34 is controlled by a slide valve 35 formed as a reduced section of the shank 36 of a manually operated thumb button 37. Shank 36 is also provided with a port 38, which, in the released (dotted line) position of thumb button 37, connects chamber 21 to an exhaust port 39.

Shank 36 also enters switch 40, and in the illustrated position, closes contact structure (not shown) to connect conductors 42 and 43 to each other. It will be understood that conductors 42 and 43 control switching mechanism which may be actuated to open and close the welding current circuit, which includes conductors 8 and 11.

A re-setting spring 44 which bears against a shoulder 45 formed on shank 36 and against the face 41 of switch 40, tends to force thumb button 37 to the dotted line position.

In operation, electrode 5 is placed in the illustrated position with respect to work section 7. Preferably, electrode 10 is then manually forced down against work section 7, against the force of spring 25. If thumb button 37 is now moved to the full line position, exhaust port 38 first moves away from exhaust port 39, disconnecting chamber 21 therefrom. Thereafter valve section 35 interconnects intake ports 34, connecting chamber 21 to supply source 32. As a consequence, piston 22 is forced to the illustrated position, establishing a welding pressure between electrodes 5 and 10 which is proportional to the air pressure in line 32. At the conclusion of the movement of thumb button 37, the contacts associated with switch 40 are actuated to the closed position, interconnecting conductors 42 and 43. As previously mentioned, conductors 42 and 43 control switching mechanism which, upon closure of the above contacts, is actuated to connect terminals 8 and 11 to a source of welding current.

With the arrangement illustrated, the welding current will continue to flow as long as thumb button 37 is held in the illustrated full line position. Preferably, however, suitable timing mechanism is employed to terminate the flow of welding current after the expiration of a predetermined interval. An arrangement suitable for accomplishing this is disclosed in the co-pending application of Orin J. Ryder, Serial No. 742,921, filed Sept. 6, 1934, and assigned to the assignee of the present application. As disclosed therein, the timing mechanism takes the form of a switch having a solenoid which, upon being energized, actuates contacts to the closed position. Cam operated mechanism associated with the switch releases the contact members to the open position upon the expiration of a predetermined time interval. The arrangement is such that the contact members cannot again be closed until the solenoid is first de-energized and then re-energized.

At the conclusion of the welding operation, thumb button 37 may be released. In the first part of its releasing motion, under the influence of spring 44, the contact members (not shown) associated with switch 40 resume the open position, interrupting the circuit between conductors 42 and 43 and terminating the welding action, if such has not already been accomplished through the use of timing mechanism or other independent mechanism, as mentioned above. As the movement of thumb button 37 continues, valve 35 disconnects chamber 21 from the supply source 32 and thereafter connects cylinder 21 to exhaust ports 39. When the latter action occurs, piston 22 moves somewhat to the right in chamber 21, under the influence of spring 25, disengaging electrode 10 from work pieces 7, and permitting electrode 5 to be withdrawn.

The modifications shown in Figs. 2 and 3 distinguish from the embodiment shown in Fig. 1 principally in that different connecting members between the piston and the movable electrode section are used, to accommodate differently shaped electrode sections. These modifications preferably embody the same type of cylinder piston control, switch, and thumb button structure as described in connection with Fig. 1. These elements, accordingly, are not completely illustrated in Figs. 2 and 3.

Referring particularly to Fig. 2, base member 48 is provided with bearing members 49 and 50. Section 52 is pivotally connected to member 50 by pin 51. Connecting links 55 and 56 are pivotally connected to sections 49 and 52, respectively, by means of pins 57 and 58. Pin 59 forms a common pivotal connection between the other end of pins 55 and 56 and one end of a connecting link 60. The other end of link 60 is pivotally connected by means of pin 61 to a connecting rod 62. Connecting rod 62 is preferably associated with the air pressure mechanism in the manner described in connection with Fig. 1.

Electrode section 54 is attached to seat 53, through an insulating member 63, by bolt 64.

Electrode sections 52 and 54 terminate, respectively, in electrodes 65 and 66 which are preferably threaded therein. Electrodes 65 and 66 are illustrated as being in welding relation to a box-like construction 67, which represents, for example, a corner post of an automobile body. It is noted that electrode 66 enters an opening 68 formed on one edge of element 67 and that both electrodes 65 and 66 are formed with restricted end sections in order to enable the formation of a weld on a restricted section. Also, electrodes 66 and 65 are angularly mounted with respect to electrode sections 52 and 54 in order to simplify their presentation to relatively inaccessible surfaces.

In operation, as described in connection with Fig. 1, thumb button 70 is moved to the illustrated position, connecting piston cylinder 71 to the air supply source 72, thereby tending to rotate links 55 and 56 about their respective axes. This tends to rotate section 52 about pin 51, and forces electrodes 65 and 66 firmly into engagement with the welding surfaces. As described, button 70 also actuates switch 73 to initiate the flow of welding current. As will be understood, terminals 74 and 75, connected respectively to electrode sections 52 and 54, lead to the source of welding current.

The construction shown in Fig. 3 is substantially like that shown in Fig. 2 with the exception that the base plate 80 is somewhat differently formed. In Fig. 3 base plate 80 comprises a central shank 81 having a shelf 82 formed at the upper end thereof to support electrode section 83. Electrode section 84 is pivotally connected to shank 81 by a pin 85. Lug 86 corresponds to member 50 of Fig. 2, and forms a pivotal mounting for link 87. The modification illustrated in Fig. 3 operates in substantially the manner described in connection with Fig. 2.

The modifications shown in Figs. 2 and 3 are preferably provided with cooling systems to maintain the temperatures of the electrodes below critical values. In Fig. 2 suitable cooling structure is represented by conduits 90 and 91, which, in a manner well known in the art, supply cooling water to electrodes 65 and 66 by way of ducts 92 formed in electrode sections 52 and 54. A flexible connection 93 connects the two water lines. The water line connections in Fig. 3 are substantially like those shown in Fig. 2. In Fig. 3, however, concentric supply and exhaust lines are employed in connection with electrode 94, as shown in the sectional view of Fig. 4.

Referring to the several modifications collectively, it is noted that in each the electrode which is required to be placed in the position of least accessibility is fixed with respect to the gripping sections of the welding gun and that the electrode which may be positioned with least difficulty is pivotally mounted with respect to the gripping section. This arrangement simplifies the positioning of the electrodes with respect to the work surfaces. It is noted also that relatively simple linkages are employed in each of the several modifications and that in each the individual electrode sections are readily replaceable. As will be understood, the provision of an automatic biasing force produces a uniform contact pressure throughout the several welds and improves the quality thereof. Similarly, the sequential arrangement whereby proper contact pressure between the welding electrodes must be obtained before the welding current can be initiated, prevents undue burning of the electrodes and welding surfaces through careless operation.

Although specific embodiments of the present invention are herein described, it is evident that various modifications may be made in the form and arrangement of parts without departing from the spirit and scope of the present invention. The described embodiments are accordingly to be considered in an illustrative and not in a limited sense.

What is claimed is:

1. A portable welding gun comprising, in combination, a housing provided with an axially extending bore, an actuating piston slidably received in said bore for axial movement therein, a first electrode arm secured to the axially forward end of said housing and extending forwardly and transversely thereof, a second electrode supporting arm pivotally connected to said housing at the axially forward end thereof, a connection between said second arm and said piston, and a hand grip secured to said housing at the axially rear end thereof and having a gripping portion in alignment with the axis of said housing.

2. A portable welding gun comprising, in combination, a handle section comprising a forwardly extending housing having an axial bore and a hand grip at the rear end of said housing, a plate secured to the axially forward end of said housing and enclosing the forward end of said bore, a piston axially movable within said bore, and an electrode supporting arm pivotally connected to said plate and actuable by said piston.

3. A portable welding gun comprising, in combination, a handle section having a housing provided with an axially extending bore and a hand grip formed at the rear end of said housing, a piston axially movable within said bore, a plate secured to the axially forward end of said housing and forming an enclosure for said bore, an electrode supporting arm pivotally connected to said plate and actuable by said piston, and spring means disposed within said bore for biasing said arm to a predetermined position.

4. A portable welding gun comprising, in combination, a handle section having a housing provided with an axially extending bore and a hand grip formed at the rear end of said housing, a piston axially movable within said bore, a plate secured to the axially forward end of said housing and forming an enclosure for said bore, an electrode supporting arm pivotally connected to said plate and actuable by said piston, and a toggle connection between said electrode supporting arm and said piston.

5. A portable welding gun comprising, in combination, a handle section having a housing provided with an axially extending bore and a hand grip formed at the rear end of said housing, a piston axially movable within said bore, a plate secured to the axially forward end of said housing and forming an enclosure for said bore, an electrode supporting arm pivotally connected to said plate and actuable by said piston, contact mechanism embodied in said gun for controlling a welding current supply, and control means for actuating said piston and said contact mechanism.

6. A portable welding gun comprising, in combination, a handle section having a housing provided with an axially extending bore, a plate secured to the axially forward end of said housing and enclosing the forward end of said bore, a first electrode arm secured to said plate and extending forwardly and transversely thereof, a second electrode supporting arm pivotally connected to said plate, a piston axially movable within said bore and having a rod passing through said plate, and a connection between said piston rod and said second electrode arm.

EDWARD J. PODANY.